(No Model.)
F. SNOW.
CUTTING TOOL FOR CARVING MACHINES.
No. 455,064. Patented June 30, 1891.
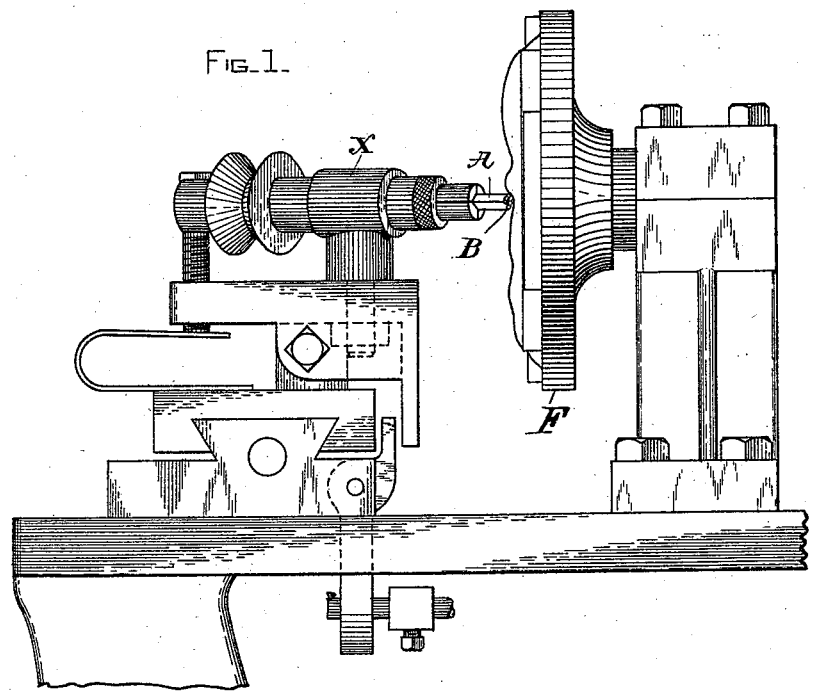
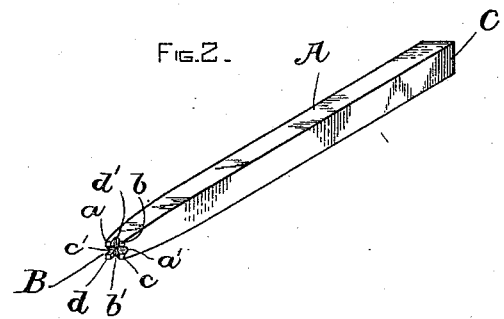
WITNESSES —
A. E. Macdonald
Benjamin Phillips
INVENTOR —
Frederick Snow
by
E. K. & B. Phillips
Attys.

UNITED STATES PATENT OFFICE.

FREDERICK SNOW, OF LYNN, MASSACHUSETTS, ASSIGNOR TO THE NATIONAL CARVING COMPANY, OF KITTERY, MAINE.

CUTTING-TOOL FOR CARVING-MACHINES.

SPECIFICATION forming part of Letters Patent No. 455,064, dated June 30, 1891.

Application filed February 18, 1891. Serial No. 381,895. (No model.)

*To all whom it may concern:*

Be it known that I, FREDERICK SNOW, a citizen of the United States, residing at Lynn, in the county of Essex and Commonwealth of Massachusetts, have invented a new and useful Cutting-Tool for Carving-Machines, of which the following is a specification.

My invention relates to an improvement in cutting-tools for that class of carving-machines having cutting-tools adapted to be applied obliquely to surface of substance to be cut, so that the cut is made by the side of the tool.

The object of my invention is to produce a cutting-tool for that class of machines especially adapted for carving stone or other hard and brittle substances, having strong cutting parts, cutting without chipping, and being easy to sharpen or repair.

In order fully to illustrate my invention so as to enable others to make and use the same, I have herein shown and described it as connected with a carving-machine, as shown and described in Letters Patent of the United States, No. 407,736, granted to William A. N. Long, which Letters Patent may be referred to herewith and are hereby made part hereof.

The accompanying drawings illustrate my invention.

Figure 1 is a side view of a face plate and spindle of the Long machine, showing my invention as applied thereto. Fig. 2 is a detached view of my invention.

Similar letters refer to similar parts throughout the several views.

A detailed description of my invention is as follows:

A, Fig. 2, represents a steel bar, a right section of which is a polygon, and which will be referred to hereinafter as a polygonal sectioned bar. The bar A may be made tapering, as shown in the drawings; but it is essential that the shape of the section be preserved. At one extremity the bar A terminates in the right section B, which cuts off the edges thereof at the points $a$, $b$, $c$, and $d$. The section B forms the cutting end of the tool, and the corners $a$, $b$, $c$, and $d$, formed by its intersection with the faces at their intersection with each other—*i. e.*, at the edges of bar A—form the cutting parts. The cutting parts $a$, $b$, $c$, and $d$ may be separated by the depressions $a'$, $b'$, $c'$, and $d'$, which operate to prevent the tool catching in the work when applied thereto, as hereinafter set forth. The section of bar A may be a triangle, pentagon, hexagon, or polygon of any number of sides. The end C of bar A is adapted to be fitted and secured in spindle X, and may be of any desired shape, depending upon the device for securing the same in said spindle.

The method of using my invention is as follows: The bar A is adjusted and secured in spindle X by any suitable device, so as to rotate therewith, and brought in contact with material to be carved, which is secured to face-plate F. (See Letters Patent to Long, hereinbefore named.) Approaching the surface of material obliquely, (see said Letters Patent,) the corners $a$, $b$, $c$, and $d$, hereinbefore described, will first come in contact therewith, and being brought against same by rotation of the bar A will act as the cutting parts of tool.

The cutting parts $a$, $b$, $c$, and $d$, formed as aforesaid, have three cutting-edges which cut the material in three directions, and thereby prevent it breaking out or chipping while being cut.

When the tool becomes dull, all its cutting-edges may be sharpened by applying a sharpening-instrument to the faces and section B.

I claim as my invention and desire to secure by Letters Patent—

1. In a carving-machine having rotary cutting-tools adapted to be applied obliquely to surface of the material to be carved, so that the cut is made by the side of the tool, a cutting-tool consisting of a polygonal-sectioned bar having cutting parts formed by the intersection of its faces with a right section forming the end of said bar, all substantially as described, and for the purposes specified.

2. In a carving-machine having rotary cutting-tools adapted to be applied obliquely to surface of material to be carved, a cutting-tool consisting of a polygonal-sectioned bar A, having the cutting parts $a$, $b$, $c$, and $d$, formed by the intersection of right section B, forming the end of bar A with faces thereof, and having the depressions $a'$, $b'$, $c'$, and $d'$ separating said cutting parts, all substantially as set forth, and for the purposes specified.

FREDERICK SNOW.

Witnesses:
LORENZO D. MARSON,
BENJAMIN PHILLIPS.